(12) United States Patent
Iijima

(10) Patent No.: US 6,521,033 B1
(45) Date of Patent: Feb. 18, 2003

(54) INK COMPOSITION, WRITING INSTRUMENT CONTAINING SAME AND METHOD OF FORMING IMAGE ON RECEIVING SURFACE

(75) Inventor: Zenshiro Iijima, Abiko (JP)

(73) Assignee: Adger Kogyo Co., Ltd. (JP)

( * ) Notice: Subject to any disclaimer, the term of this patent is extended or adjusted under 35 U.S.C. 154(b) by 11 days.

(21) Appl. No.: 09/610,532

(22) Filed: Jul. 7, 2000

(30) Foreign Application Priority Data

Jul. 14, 1999 (JP) ............................................. 11-199931
May 11, 2000 (JP) ........................................ 2000-138776

(51) Int. Cl.⁷ ............................................. C09D 11/00
(52) U.S. Cl. ................. 106/31.58; 106/31.86; 106/31.32; 106/31.64
(58) Field of Search ........................... 106/31.58, 31.86, 106/31.32, 31.64

(56) References Cited

U.S. PATENT DOCUMENTS

| | | | | |
|---|---|---|---|---|
| 4,557,618 A | * | 12/1985 | Iwata et al. | 401/34 |
| 4,840,833 A | * | 6/1989 | Iijima | 106/31.32 |
| 4,954,174 A | * | 9/1990 | Imagawa | 106/31.64 |
| 5,316,574 A | * | 5/1994 | Fujita et al. | 106/31.64 |
| 5,324,764 A | * | 6/1994 | Fujita et al. | 106/31.64 |
| 5,667,571 A | | 9/1997 | Ono et al. | 106/31.48 |
| 5,849,814 A | * | 12/1998 | Fujita | 106/31.13 |
| 5,905,102 A | * | 5/1999 | Nagasawa et al. | 106/31.13 |
| 5,972,083 A | | 10/1999 | IIjima | 106/31.32 |
| 6,037,391 A | * | 3/2000 | Iida | 106/31.27 |
| 6,051,629 A | * | 4/2000 | Ichikawa et al. | 106/31.57 |
| 6,203,603 B1 | * | 3/2001 | Takayama et al. | 106/31.16 |
| 6,248,692 B1 | * | 6/2001 | Sano et al. | 106/31.16 |
| 6,419,733 B1 | * | 7/2001 | Sano et al. | 106/31.86 |
| 6,379,441 B1 | * | 4/2002 | Kanaya et al. | 106/31.27 |
| 6,398,441 B1 | * | 6/2002 | Takayanagi | 106/31.32 |

FOREIGN PATENT DOCUMENTS

| | | |
|---|---|---|
| EP | 0393901 | 10/1990 |
| FR | 1492825 | 11/1967 |
| GB | 2058113 | 4/1991 |

* cited by examiner

*Primary Examiner*—Helene Klemanski
*Assistant Examiner*—Veronica F. Faison
(74) *Attorney, Agent, or Firm*—Lorusso & Loud

(57) ABSTRACT

An ink containing a coloring agent dissolved in a mixed solvent including a first solvent which is liquid at 20° C. and which is polyalkylene glycol or an ethylene glycol monoether and a second solvent selected from monohydric alcohols, ketones, esters and halogenated hydrocarbons. An image of the ink formed on an ink permeable sheet penetrates through the sheet and is transferred to a surface of a desired object overlaid with the sheet.

18 Claims, No Drawings

INK COMPOSITION, WRITING INSTRUMENT CONTAINING SAME AND METHOD OF FORMING IMAGE ON RECEIVING SURFACE

BACKGROUND OF THE INVENTION

1. Field of the Invention

This invention relates generally to an ink composition for use in handicraft, tailor or embroidery fields and, more specifically to an ink useful for forming a copy image, corresponding to an original image on an ink permeable sheet, on a receiving surface of an object such as textile, leather, paper, plastic or metal. The present invention is also directed to a writing instrument containing the above ink composition and to a method of forming an image on a receiving surface of an object.

2. Description of Prior Art

A tracing paper having a solid ink layer on one surface thereof has been hitherto used to form, on a receiving surface, a copy image corresponding to an original image of a sheet. The tracing paper is interposed between the receiving surface and the sheet with the ink layer being in contact with the receiving surface. The original image is then traced with a rigid, sharp-tipped member so that the ink at pressed portions is transferred to the receiving surface to form a copy image thereon. This method has a problem because it is difficult or troublesome to maintain the relative position between the receiving surface and the image sheet unchanged throughout the course of the tracing step.

U.S. Pat. No. 5,972,083 assigned to Adger Kogyo Co., Ltd. discloses a method of making a copy image on a receiving surface of an object without using a tracing paper. In this method, a surface bearing an original pattern is overlaid with a transparent or translucent thin sheet. The original pattern is then traced using a pen containing a specific ink to form a copy pattern on the sheet. The receiving surface of the object is overlaid with the copy pattern-bearing sheet and the assembly is heated with an iron, whereby the ink of the copy pattern penetrates through the sheet and is transferred to the receiving surface to form the image thereon. The ink used in this method contains an organic solvent in which a first, white coloring agent selected from salicylic acid and acetylsalicylic acid and a second coloring agent giving a color other than white are dissolved. This method has a problem because of the necessity of an ironing step.

U.S. Pat. No. 4,368,076 assigned to Adger Kogyo Co., Ltd. discloses an erasable ink composition containing cobalt thiocyanate dissolved in an aqueous solvent containing polyalkylene glycol having a molecular weight of 100–1000.

SUMMARY OF THE INVENTION

It is the primary object of the present invention to provide an ink composition useful for forming a copy image, corresponding to an original pattern, on a receiving surface of an object.

Another object of the present invention is to provide a simple method for forming a copy image on a desired surface.

It is a further object of the present invention to provide a writing instrument capable of forming a copy image on a desired surface.

In accordance with one aspect of the present invention, there is provided an ink composition comprising a mixed solvent including a first solvent which is liquid at 20° C. and which is selected from the group consisting of polyalkylene glycol, ethylene glycol monoethers and mixtures thereof and a second solvent selected from the group consisting of monohydric alcohols, ketones, esters, halogenated hydrocarbons and mixtures thereof, and a coloring agent dissolved in said mixed solvent.

In another aspect, the present invention provides a writing instrument comprising an ink container containing the above ink composition, and a rigid pen tip from which the ink composition in said ink container is exuded upon writing.

The present invention also provides a writing instrument comprising an ink container containing an ink composition, and a rigid pen tip from which said ink composition in said ink container is exuded upon writing, said ink composition comprising a solvent selected from the group consisting of monohydric alcohols, ketones, esters, halogenated hydrocarbons and mixtures thereof, and a coloring agent dissolved in said solvent.

The present invention further provides a method of making a copy image, corresponding to an original pattern on an ink permeable sheet, on a receiving surface of an object, comprising the steps of:

(a) overlaying said sheet on said receiving surface; and (b) tracing said original pattern on said sheet with the above writing instrument.

The present invention further provides a method of making a copy image, corresponding to an original pattern on an ink permeable sheet, on a receiving surface of an object, comprising the steps of:

(a) applying the above ink composition on said original pattern of said sheet;

(b) overlaying said sheet on said receiving surface; and then (c) tracing said original pattern on said sheet with a rigid member so that said ink composition is transferred from said sheet on said receiving surface to form the copy image thereon.

Other objects, features and advantages of the present invention will become apparent from the detailed description of the preferred embodiments of the invention to follow.

DETAILED DESCRIPTION OF THE PREFERRED EMBODIMENTS OF THE INVENTION

The ink composition according to the present invention contains a coloring agent dissolved in a mixed organic solvent including a first solvent which is liquid at 20° C. and which is at least one member selected from polyalkyylene glycol and ethylene glycol monoethers, and a second solvent which is at least one member selected from monchydric alcohols, ketones, esters and halogenated hydrocarbons.

The use of the mixed solvent permits the ink composition to quickly penetrate through a sheet, such as paper or cloth, on which an original pattern is provided (such a sheet will be hereinafter referred to simply as sheet), while minimizing blurs. The mixed solvent can also impart dry-preventing property to the ink and can be good solvent to the coloring agent.

The polyalkyylene glycol generally has a molecular weight of not greater than 400, preferably not greater than 300, more preferably not greater than 250. A mixture of polyalkylene glycols having different molecular weights may be used as long as the mixture is liquid at 20° C. Polyethylene glycol is preferably used. Ethylene glycol monoethers are also called cellosolves. Methyl cellosolve and ethyl cellosolve are preferably used.

Illustrative of suitable monohydric alcohols are ethanol, methanol, propanol, isopropanol, isobutanol, butanol, secondary amyl alcohol and tertiary amyl alcohol. Illustrative of suitable ketones are acetone and methyl ethyl ketone. Illustrative of suitable esters include ethyl acetate. Illustrative of suitable halogenated hydrocarbons are methylene chloride, ethylene chloride and trichloroethylene. The use of monohydric alcohol, especially ethanol, is particularly preferred for reasons of safety, freedom of odor, solubility and volatility.

The weight ratio of the first solvent to the second solvent varies depending upon intended penetrating efficiency of the ink through the sheet, but may generally range from 0.1:99.9 to 90:10.

Dissolved in the mixed organic solvent is a coloring agent. Any coloring agent can be used as the coloring agent as long as it is soluble in the mixed solvent and can give, by itself or in combination with a developer, a legible pattern of, for example, white, red, blue, green or black, on a white, light-colored or dark-colored receiving surface. Depending upon the intended use, the coloring agent may be erasable when the pattern thereof is treated with any suitably means such as heat, water or an organic solvent or when the pattern is allowed to stand for a certain period of time (e.g. 1 hour or more).

The coloring agent may be of an independent type which by itself gives a color of the ink or of a dependent type which gives a color when combined with a developer.

Examples of non-erasable, independent-type coloring agents include various types of solvent-soluble dyes such as Basic Red 12, Solvent Red 8, Valifast Red 3312, Valifast Yellow 1110, Valifast Blue 2606, Basic Brown 1, Basic Green 4, Basic Blue 28 and Crystal Violet.

Examples of erasable, independent-type coloring agents include cobalt thiocyanate, ferric thiocyanate, salicylic acid and acetyl salicylic acid.

Examples of dependent-type coloring agents include various acid-base indicators such as methyl red, propyl red, naphthyl red; and lactone dyes such as crystal violet lactone and rhodamine lactone. Examples of developers for the dependent-type coloring agents include acidic substances such as citric acid, malic acid, salicylic acid and acetylsalicylic acid (the two salicylic compounds will be hereinafter referred to as (acetyl)salicylic acid); and aromatic bases such as amines (e.g. triethanol amine).

For example, methyl red colors red at a pH of below 4.4 and becomes orange at a pH of above 6.2. In the presence of (acetyl)salicylic acid, therefore, an ink image of methyl red colors red. When (acetyl)salicylic acid disappears by sublimation, the image turns orange. The orange image is turned light yellow when wiped with a wet cloth. An ink containing crystal violet lactone and (acetyl)salicylic acid gives a blue image which may be erased when wiped with a wet cloth or upon lapse of time. In this case, the life of the blue image can be increased, when (acetyl)salicylic acid is used in conjunction with citric acid.

The coloring agent is used in an amount sufficient to provide a clear image on a receiving surface of an object and is generally in the range of 0.01–25% by weight, based on the weight of the ink composition, though the amount varies depending on the kind of the coloring agent. For example, the amount of the non-erasable, independent-type coloring agent is generally 0.1–15% by weight; the amount of the erasable, independent-type coloring agent is generally 0.3–25% by weight; and the amount of the dependent-type coloring agent is generally 0.01–10% by weight, each based on the weight of the ink composition.

(Acetyl)salicylic acid gives a white pattern. Because of solubility in water and of sublimability of the (acetyl)salicylic acid, the white pattern is erasable when wiped with a wet cloth or when heated for a suitable period of time. Further, because of its acidity, (acetyl)salicylic acid can serve as a developer as described above. Further, it has been found that (acetyl)salicylic acid serves to improve penetration efficiency of the ink through the sheet and transferring efficiency of the ink image from the sheet to a receiving surface of an object.

Thus, in a preferred embodiment according to the present invention, (acetyl)salicylic acid is contained in the ink composition together with a coloring agent giving a color image other than white, even when the coloring agent does not require an acidic developer for the development of its color. (Acetyl)salicylic acid is used in an amount of at least 1% by weight, preferably at least 5% by weight, based on the weight of the mixed solvent. The upper limit of (acetyl)salicylic acid is the saturated concentration. The solubility of (acetyl)salicylic acid increases when the first solvent is used as a mixture with the second solvent.

For reasons of transferability, it is preferred that the ink composition be substantially water free.

The ink composition according to the present invention can form an ink image on a receiving surface of an any desired object such as a textile, a leather, a paper, a plastic or a metal. The receiving surface may have any color inclusive of white and black.

In one preferred embodiment according to the present invention, a copy image, corresponding to an original pattern printed on paper or other ink permeable sheet, is formed on a receiving surface of an object, by overlaying the sheet on the receiving surface, and tracing the original pattern with a writing instrument having an ink container containing the above ink composition. By this simple step, the ink exuded from the writing instrument on one, top surface of the sheet can penetrate through the sheet, can arrive at the other surface of the sheet and can be transferred to the receiving surface. In this case, it is important that the writing instrument should have a rigid pen tip from which the ink composition is exuded upon writing and which can transmit the writing pressure to the sheet in order to effectively transfer the ink to the receiving surface. The rigid pen tip may be, for example, a pen tip formed of a hard material such as plastic, metal or ceramic and having one or more axially extending fine ink passages, a pen tip formed from fibers which are fuse bonded to each other or bonded with a hardenable adhesive or a pen tip having a rotatable ball at the tip. A soft pen tip made of a soft felt or sponge is not suitable. It is also desirable that the ink composition have a weight ratio of the first solvent to the second solvent of 30:70 or less, more preferably 0.5:99.5 to 20:80, most preferably 1:99 to 10:90, for reasons of pressure transferability of the ink image.

In another embodiment, a writing instrument having a rigid pen tip is charged with an ink composition containing a coloring agent dissolved in a solvent selected from monohydric alcohols, ketones, esters, halogenated hydrocarbons and mixtures thereof. When a receiving surface is overlaid with a sheet having an original pattern and when the pattern is traced using the above writing instrument, the ink image is transferred from the sheet to the receiving surface. Because of the absence of the first solvent, however, blurs tend to form. If the blurs can be ignored, the above writing instrument is suitably used for forming a copy image.

In a further embodiment, a copy image, corresponding to an original pattern on an ink permeable sheet, is formed on a receiving surface of an object, by applying the above ink composition on the original pattern of the sheet. The receiving surface is overlaid with the ink-applied sheet and the original pattern on the sheet is traced with a rigid tip member so that the ink composition is transferred from the sheet to the receiving surface to form the copy image thereon. The rigid tip member may be a metallic pen or a stencil pen formed of any rigid material, such as plastic, metal or wood, capable of applying a writing pressure to the traced portions. Application of the ink composition to the original image of the sheet may be performed by tracing the original pattern with a writing instrument having an ink container for containing the ink composition and a pen tip adapted for exuding the ink therefrom upon writing. The pen tip may be soft, like a felt tip. It is preferred that the tracing of the original pattern of the sheet with the wiring instrument be carried out after the sheet has been placed on the receiving surface. It is desirable that the ink composition have a weight ratio of the first solvent to the second solvent of 5:95 to 90:10, more preferably 10:90 to 70:30, most preferably 20:80 to 70:30, for reasons of pressure transferability of the ink image.

The following examples will further illustrate the present invention. Parts are by weight.

EXAMPLE 1-1

Ethanol (97 parts) was mixed with 3 parts of polyethylene glycol (average molecular weight: 200) to obtain a mixed solvent.

Crystal violet (0.3 part) was dissolved in 20 parts of the mixed solvent to form a blue ink. The ink was charged in an ink tank of a pen having a rigid plastic pen tip. A white cloth was overlaid with a paper having an original pattern. Then, the original pattern was traced with the above pen. A clear blue copy image was found to be formed on the white cloth.

EXAMPLE 1-2

Methyl red (0.05 part) was dissolved in 20 parts of the mixed solvent obtained in Example 1-1 to form an orange ink. Using this ink, the procedure of Example 1-1 was repeated. A clear orange copy image was found to be formed on the cloth. The copy image did not disappear spontaneously but turned light yellow when wiped with a wet cloth.

EXAMPLE 1-3

Cobaltous thiocyanate (1 part) was dissolved in 20 parts of the mixed solvent obtained in Example 1-1 to form a light blue ink. Using this ink, the procedure of Example 1-1 was repeated. A clear blue copy image was found to be formed on the cloth. The copy image was erased when wiped with a wet cloth.

EXAMPLE 1-4

Valifast Red 3312 (0.2 part) was dissolved in 20 parts of the mixed solvent obtained in Example 1-1 to form a red ink. Using this ink, the procedure of Example 1-1 was repeated. A clear red copy image was found to be formed on the cloth.

EXAMPLE 2-1

Ethanol (92 parts) was mixed with 8 parts of polyethylene glycol (average molecular weight: 200), to which 20 parts of salicylic acid was dissolved to obtain a mixed solvent.

Crystal violet lactone (0.4 part) was dissolved in 20 parts of the mixed solvent to form a blue ink. Using this ink, the procedure of Example 1-1 was repeated. A clear blue copy image was found to be formed on the white cloth. The copy image spontaneously disappeared after two days.

EXAMPLE 2-2

Methyl red (0.1 part) was dissolved in 20 parts of the mixed solvent obtained in Example 2-1 to form a red ink. Using this ink, the procedure of Example 2-1 was repeated. A clear red copy image was found to be formed on the cloth. The copy image spontaneously turned orange after two days and turned light yellow when wiped with a wet cloth.

EXAMPLE 2-3

Cobaltous thiocyanate (2 parts) was dissolved in 20 parts of the mixed solvent obtained in Example 2-1 to form a light blue ink. Using this ink, the procedure of Example 2-1 was repeated. A clear blue copy image was found to be formed on the cloth. The copy image was erased when wiped with a wet cloth.

EXAMPLE 2-4

Valifast Blue 2606 (0.1 part) was dissolved in 20 parts of the mixed solvent obtained in Example 2-1 to form a blue ink. Using this ink, the procedure of Example 1-1 was repeated. A clear blue copy image was found to be formed on the cloth.

Copy images of Examples 2-1 to 2-4 were sharper than those of Examples 1-1 to 1-4.

EXAMPLE 3

Examples 2-1 to 2-4 were each repeated in the same manner as described except that ethyl cellosolve (ethylene glycol monoethyl ether) was substituted for the polyethylene glycol. The results were almost the same as those in Examples 2-1 to 2-4.

EXAMPLE 4

Examples 2-1 to 2-4 were each repeated in the same manner as described except that isopropanol was substituted for the ethanol. The results were almost the same as those in Examples 2-1 to 2-4.

EXAMPLE 5

Using the mixed solution obtained in Example 2-1 as an ink, the procedure of Example 2-1 was repeated. A white copy image was found to be formed on a black cloth used in place of the white cloth.

EXAMPLE 6

Examples 2-1 to 2-4 were each repeated in the same manner as described except that acetylsalicylic acid was substituted for the salicylic acid. The results were almost the same as those in Examples 2-1 to 2-4.

EXAMPLE 7-1

Ethanol (60 parts) was mixed with 40 parts of polyethylene glycol (average molecular weight: 200), to which 50 parts of salicylic acid was dissolved to obtain a mixed solvent.

Crystal violet lactone (0.3 part) was dissolved in 20 parts of the mixed solvent to form a blue ink. The ink was charged in an ink tank of a felt tip pen. A white cloth was overlaid with a paper having an original pattern. Then, the original pattern was traced with the above pen and then with a rigid sharp-tipped member (stencil pen). A clear blue copy image was found to be formed on the white cloth. The copy image spontaneously disappeared after four days.

EXAMPLE 7-2

Methyl red (0.05 part) was dissolved in 20 parts of the mixed solvent obtained in Example 7-1 to form a red ink. Using this ink, the procedure of Example 7-1 was repeated. A clear red copy image was found to be formed on the cloth. The copy image turned light orange when wiped with a wet cloth.

EXAMPLE 7-3

Cobaltous thiocyanate (1 parts) was dissolved in 20 parts of the mixed solvent obtained in Example 7-1 to form a light blue ink. Using this ink, the procedure of Example 7-1 was repeated. A clear blue copy image was found to be formed on the cloth. The copy image was erased when wiped with a wet cloth.

EXAMPLE 7-4

Valifast Red 3312 (0.2 part) was dissolved in 20 parts of the mixed solvent obtained in Example 7-1 to form a red ink. Using this ink, the procedure of Example 7-1 was repeated. A clear red copy image was found to be formed on the cloth.

EXAMPLE 8

Ethanol (70 parts) was mixed with 30 parts of ethylene glycol monoethyl ether (ethyl cellosolve), to which 45 parts of acetylsalicylic acid was dissolved to obtain a mixed solvent. In this mixed solvent, the coloring agents used in Examples 7-1 to 7-4 were each dissolved to obtain ink compositions. Clear copy images were found to be obtained.

EXAMPLE 9

Crystal violet lactone (0.4 part) and 3 parts of citric acid were dissolved in 20 parts of ethanol to form a blue ink. Using this ink, the procedure of Example 1-1 was repeated. A blue copy image having slight blurs was found to be formed on the cloth. The blue image was erased when wiped with a wet cloth.

EXAMPLE 10

Methyl red (0.1 part) was dissolved in 20 parts of ethanol to form an orange ink. Using this ink, the procedure of Example 1-1 was repeated. An orange copy image having slight blurs was found to be formed on the cloth.

Comparative Example 1

In a mixed solvent consisting of 80 parts of isopropanol and 20 parts of ethylene chloride were dissolved 30 parts of salicylic acid, 0.8 part of polyethylene glycol (molecular weight: 600,000 to 1,110,000) and 0.1 part of methyl red to obtain a red ink. Using this ink, the procedures of Example 1-1 and Example 7-1 were repeated. However, a clear red copy image was not able to be formed on the cloth.

Comparative Example 2

In a mixed solvent consisting of 70 parts of isopropanol and 30 parts of ethylene chloride were dissolved 20 parts of acetylsalicylic acid, 0.8 part of polyethylene glycol (molecular weight: 600,000 to 1,110,000) and 0.2 part of crystal violet lactone to obtain a blue ink. Using this ink, the procedures of Example 1-1 and Example 7-1 were repeated. However, a clear blue copy image was not able to be formed on the cloth.

Comparative Example 3

In 100 g of water were dissolved 15 g of cobaltous thiocyanate, to which 10 g of polyethylene glycol (molecular weight: 200) were added. Using the thus obtained blue ink, the procedures of Example 1-1 and Example 7-1 were repeated. However, a clear blue copy image was not able to be formed on the cloth.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An ink composition comprising:
    a mixed solvent including a first solvent which is liquid at 20° C. and which is selected from the group consisting of polyalkylene glycol, methyl cellosolve, ethyl cellosolve and mixtures thereof and a second solvent selected from the group consisting of monohydric alcohols, ketones, esters, halogenated hydrocarbons and mixtures thereof, and
    a coloring agent dissolved in said mixed solvent.

2. An ink composition as claimed in claim 1, wherein said coloring agent gives an erasable pattern.

3. An ink composition as claimed in claim 2, wherein said coloring agent is selected from the group consisting of salicylic acid, acetylsalicylic acid, methyl red, crystal violet lactone and cobalt thiocyanate.

4. An ink composition as claimed in claim 1, wherein the weight ratio of said first solvent to said second solvent is 0.5:99.5 to 30:70.

5. An ink composition as claimed in claim 1, wherein said second solvent includes ethanol.

6. An ink composition as claimed in claim 1, wherein said coloring agent gives a color other than white and wherein said ink composition further comprises salicylic acid and/or acetylsalicylic acid dissolved in said mixed solvent.

7. An ink composition as claimed in claim 6, wherein said coloring agent gives an erasable pattern.

8. An ink composition as claimed in claim 7, wherein said coloring agent is selected from the group consisting of methyl red, crystal violet lactone and cobalt thiocyanate.

9. An ink composition as claimed in claim 6, wherein the weight ratio of said first solvent to said second solvent is 10:90 to 90:5.

10. An ink composition as claimed in claim 6, wherein said second solvent includes ethanol.

11. A writing instrument comprising an ink container containing an ink composition according to claim 4, and a rigid pen tip from which said ink composition in said ink container is exuded upon writing.

12. A writing instrument comprising an ink container containing an ink composition according to claim 9, and a pen tip from which said ink composition in said ink container is exuded upon writing.

13. A writing instrument comprising an ink container containing an ink composition, and a rigid pen tip from which said ink composition in said ink container is exuded upon writing, said ink composition comprising a solvent selected from the group consisting of ethanol, methanol, propanol, isopropanol, isobutanol, butanol, secondary amyl alcohol and tertiary amyl alcohol, ketones, esters and mixtures thereof, and a coloring agent dissolved in said solvent.

14. A method of making a copy image, corresponding to an original pattern on an ink permeable sheet, on a receiving surface of an object, comprising the steps of:

(a) overlaying said sheet on said receiving surface; and (b) tracing said original pattern on said sheet with a writing instrument according to claim 11.

15. A method of making a copy image, corresponding to an original pattern on an ink permeable sheet, on a receiving surface of an object, comprising the steps of:

(a) applying an ink composition according to claim 9 on said original pattern of said sheet;

(b) overlaying said sheet on said receiving surface; and then (c) tracing said original pattern on said sheet with a rigid member so that said ink composition is transferred from said sheet on said receiving surface to form the copy image thereon.

16. An ink composition as claimed in claim 1 wherein said second solvent is a monohydric alcohol selected from the group consisting of ethanol, methanol, propanol, isopropanol, isobutanol, butanol, secondary amyl alcohol and tertiary amyl alcohol.

17. An ink composition as claimed in claim 1 wherein said monohydric alcohols are selected from the group consisting of ethanol, methanol, propanol, isopropanol, isobutanol, butanol, secondary amyl alcohol and tertiary amyl alcohol.

18. An ink composition as claimed in claim 1 wherein said first solvent is methyl cellosolve, ethyl cellosolve or mixture thereof.

\* \* \* \* \*